United States Patent [19]
Arent

[11] Patent Number: 4,494,627
[45] Date of Patent: Jan. 22, 1985

[54] PORTABLE WORK STATION

[76] Inventor: Randy L. Arent, Box 75, Red Feathers Lakes, Colo. 80545

[21] Appl. No.: 490,375

[22] Filed: May 2, 1983

[51] Int. Cl.³ .............................................. F16M 11/00
[52] U.S. Cl. .................................. 182/129; 182/184; 182/224
[58] Field of Search ............... 182/181, 184, 224, 225, 182/154, 129

[56] References Cited
U.S. PATENT DOCUMENTS

| | | |
|---|---|---|
| 841,931 | 1/1907 | Chesebro ............................ 182/181 |
| 2,726,712 | 12/1955 | Weller ................................. 182/181 |
| 3,848,700 | 11/1974 | Davis ................................... 182/181 |
| 3,999,628 | 12/1976 | Parson . | |

Primary Examiner—Reinaldo P. Machado
Attorney, Agent, or Firm—Dean P. Edmundson

[57] ABSTRACT

A portable work station is described which is very sturdy and stable. The station has three supporting legs so that it may be used safely on uneven or sloping surfaces. The station also includes an electrical power receptacle which increases the utility of the work station.

7 Claims, 3 Drawing Figures

PORTABLE WORK STATION

FIELD OF THE INVENTION

This invention relates to work stations. More particularly, it relates to portable work stations for the construction, carpentry, electrical, and plumbing trades.

BACKGROUND OF THE INVENTION

In the building and finishing trades such as carpentry, electrical, construction, plumbing, and the like, the workmen must work with their materials, both prior to placing the materials in their final setting and also afterward. For example, a carpenter must measure, shape and ready various types of lumber before it can be erected or placed, a plumber must measure, cut, thread and otherwise ready his supplies before they can be installed, etc. After the materials and supplies are readied and placed into their intended environment, the workmen must secure them, inspect, and otherwide prepare them for use.

In each of these activities the workmen must support the materials and supplies in order to be able to work with them, and during installation of the materials and supplies the workmen must support themselves on ladders or other raised supporting surfaces in order to be able to reach their work. A common device which has been used for these purposes is the conventional four-legged sawhorse. While such a device may be inexpensive and easily replaceable if it fails or is damaged, there are numerous disadvantages associated with such a device. Because the sawhorse has four legs it does not provide a stable or safe supporting surface unless all four legs are supported in the same plane. Accordingly, the sawhorse does not provide a stable support when used on uneven surfaces. Yet, on a typical construction site virtually all surfaces are uneven.

Furthermore, typical sawhorses are limited in the amount of weight that they can safely support because of the nature of their construction. Also, when conventional sawhorses are used to support scaffolding the problems of stability are compounded because there are at least two sawhorses used for that purpose. Consequently, it is then necessary to position two such devices in the same plane in order to obtain a stable support. This, of course, is very difficult to do on a construction site.

Moreover, most workmen must continually work with electrically powered tools in their trade and accordingly are using electrical extension cords in order to bring electricity to the work site. Such extension cords of necessity are connected to the various power tools and are constantly being dragged over the sawhorses, the materials and the supplies as the workmen move their tools. This not only poses the danger of workmen tripping on the cords but also creates a hazard of the cords being caught, cut, or entangled in the power tools.

Some of the problems associated with the use of conventional sawhorses may be alleviated by the use of tables. However, tables, of necessity, would be larger, heavier and much more cumbersome to transport and position than the conventional sawhorse. Naturally, the tables would also be more expensive to construct and would not be as easy to use by an individual workman. The tables would not alleviate the problems associated with uneven supporting surfaces.

SUMMARY OF THE INVENTION

In accordance with the present invention there is provided a portable work station particularly adapted for use by workmen in the various building, construction and finishing trades. The portable work station comprises:

(a) an elongated member having a generally flat top working surface, the elongated member having first and second ends;
(b) a pair of legs each having an upper end and a lower end, the upper end of each leg being securely attached to the elongated member near its first end, wherein each leg depends downwardly from the elongated member;
(c) bracing means connecting said pair of legs;
(d) a single leg having an upper end and a lower end, the upper end thereof being securely attached to said elongated member near said second end, wherein the leg depends downwardly from the elongated member and is disposed directly beneath the working surface;
(e) electrical receptacle means secured to the work station beneath the working surface; and
(f) optionally, extensible leg means secured to the elongated member near its second end, the extensible leg means being vertically adjustable to a length greater than the length of the single leg.

The work station of this invention is sturdy and extremely stable even on irregular surfaces. The work station is also easily transported to a work site and from place to place at a particular work site. The work station has a working surface on its top which is adaptable for use by workmen of the various trades. Because the work station includes an electrical power outlet under the working surface, a power extension cord need only lead to the underside of the working surface, thus centralizing a power source and eliminating the need to run extension cords over sawhorses and the like to reach the site where they would be required.

Also, the provision of the extensible leg means enables one end of the work station to be adjusted vertically so as to level the working surface when necessary or desirable. For example, when using the work station to support scaffolding or the like it is possible to level the top supporting surface even where the ground is not level or is irregular in contour.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
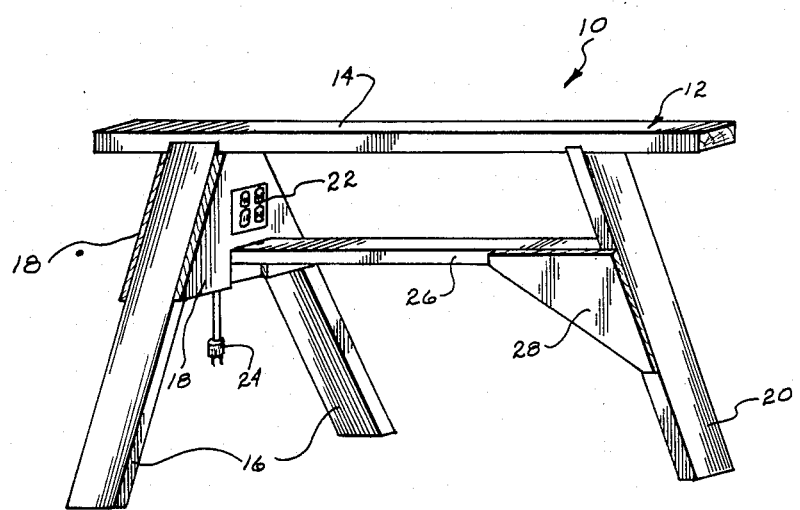
FIG. 1 is an isometric view of one embodiment of the invention.

In FIG. 1 there is shown a portable work station 10 including elongated member 12 having a generally flat top working surface 14. Supporting one end of member 12 is a pair of legs 16 which are securely attached to member 12 at their upper ends. Preferably the lower ends of legs 16 extend outwardly from the vertical plane defined by the working surface 14 so that additional stability is imparted to the work station. It is also preferable for the upper ends of legs 16 to fit within complementary shaped notches in member 12, as shown. The legs 16 may be attached by screws, nails or bolts, for example, and may also be glued to member 12.

Bracing means 18 connects legs 16, and preferably also is connected to member 12 for additional bracing effect. Bracing means 18 primarily increases the amount of weight which can be supported on member 12. One embodiment of bracing means 18 comprises plywood (e.g., 0.5 inch thick) which is secured into position by screws, nails, or bolts, and may also be glued. Preferably there are two bracing means 18, one being secured on the outward side of legs 16 and the other being secured on the inward side of legs 16, as shown in FIG. 1.

A single leg 20 is securely attached at its upper end to the underside of member 12 near the end opposite where legs 16 are attached. Leg 20 depends downwardly and is disposed directly beneath working surface 14 in order to provide good stability to the work station. Preferably the upper end of leg 20 is received in a complementary shaped notch in member 12 and secured by screws, nails, or bolts, and may also be glued.

Electrical receptacle means 22 is carried by the work station beneath working surface 14. One manner of attaching receptacle means 22 is to secure it to bracing means 18, as shown in FIG. 1. To activate the receptacle means 22, cord 24 may be operably connected to an extension cord. A workman may then simply plug a desired power tool into the receptacle under the working surface 14. This design keeps the extension cord away from the work surface, thus avoiding the dangers and hazards associated with having a power extension cord on top of the working surface or in the way of the materials being worked on.

Additional bracing support is imparted to work station 10 by reinforcement means 26 extending between leg 20 and bracing means 18 or legs 16. Reinforcement means 26 may be further secured by brace means 28 affixed to leg 20 and reinforcement means 26 by screws, nails, or bolts, and may also be glued. As an example, brace means 28 comprise plywood (e.g., 0.5 inch thick).

Figure 2:
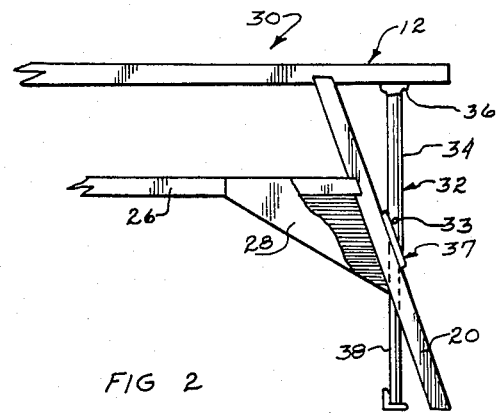
FIG. 2 is a side view of one end of another embodiment of work station of the invention which includes extensible leg means.
Figure 3:
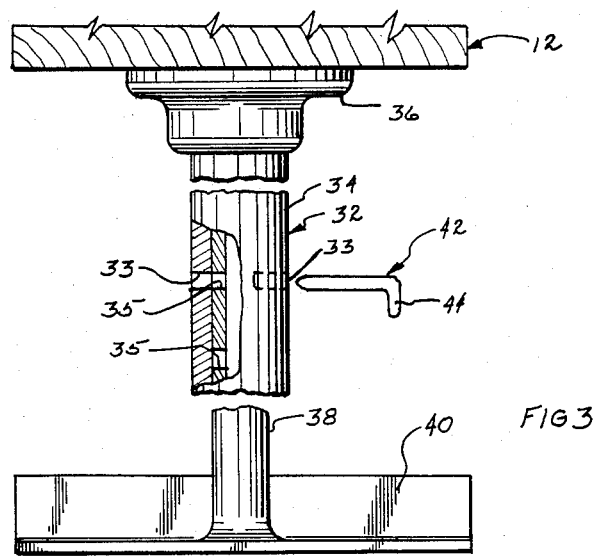
FIG. 3 shows one manner in which the extensible leg means may operate.

In FIG. 2 there is shown a portion of another embodiment of work station 30 which additionally includes extensible leg means 32 secured at its upper end to the underside of elongated member 12. The embodiment of extensible leg means shown in FIGS. 2 and 3 includes fixed tubular member 34 anchored at its upper end to member 12 by anchor means 36. Tubular member 34 depends downwardly directly beneath member 12 and working surface 14. The length of tubular member 34 is no greater than the length of leg 20. Preferably, as shown in FIG. 2, the lower end of tubular member 34 is secured to leg 20 by securement means 37.

Moveable number 38 can move vertically with respect to tubular member 34, preferably by sliding within tubular member 34. Member 38 preferably has a foot 40 secured to its lower end, e.g., by welding or bolting it to member 38. Foot 40 provides a stable base for supporting the end of the work station on sloping of uneven ground, i.e., when it is necessary to raise the other end of the work station in order to level surface 14. Foot 40 may be, for example, a length of angle iron or other suitable material. The length of member 38 may vary. For example, it may be as long as tubular member 34 or shorter.

Latch means 42 is adapted to secure the relative position of tubular member 34 and moveable member 38 to each other. This is accomplished by inserting pin 44 through apertures 33 in tubular member 34 and mating openings 35 in moveable member 38. Preferably there are numerous openings 35 vertically spaced along moveable member 38. In this manner moveable member 38 can be extended to any desired distance and then secured against further vertical movement by inserting pin 44 through apertures 33 and openings 35.

Other variants are possible without departing from the scope of the present invention.

What is claimed is:

1. A portable work station comprising:
   (a) an elongated member having a generally flat top working surface, said elongated member having a first end and a second end;
   (b) a pair of legs each having an upper end and a lower end, the upper end of each said leg being securely attached to said elongated member near said first end, wherein each said leg depends downwardly from said elongated member;
   (c) bracing means connecting said pair of legs;
   (d) a single leg having an upper end and a lower end, the upper end thereof being securely attached to said elongated member near said second end, wherein said leg depends downwardly from said elongated member and is disposed directly beneath said working surface;
   (e) electrical receptacle means secured to said work station beneath said working surface; and
   (f) extensible leg means secured to said elongated member near its second end, wherein said extensible leg means is vertically adjustable to a length greater than the length of said single leg, wherein said extensible leg means may be extended and is adapted to support said second end of said elongated member.

2. A portable work station in accordance with claim 1, wherein said extensible leg means comprises a fixed tubular member, a moveable member, and latch means, wherein said fixed tubular member is secured at its upper end to said elongated member near its second end and depends downwardly therefrom directly beneath said working surface, said tubular member having a length no greater than the length of said single leg, wherein said moveable member is supported by said tubular member and is adapted to move vertically relative to said tubular member, and wherein said latch means is adapted to secure said moveable member against vertical movement after said moveable member has been moved to a desired vertical position.

3. A portable work station in accordance with claim 2, wherein said moveable member is adapted to be slidably received within said tubular member.

4. A portable work station in accordance with claim 2, wherein said latch means comprises a removable pin which extends through openings in said tubular member and said moveable member.

5. A portable work station in accordance with claim 2, wherein said moveable member includes foot means which has a lateral dimension greater than the diameter of said moveable member.

6. A portable work station in accordance with claim 2, wherein the lower end of said tubular member is securely attached to said single leg, and wherein said moveable member ends through an opening in said single leg.

7. A portable work station comprising:
(a) an elongated member having a generally flat top working surface, said elongated member having first and second ends;
(b) a pair of legs each having an upper end and a lower end, the upper end of each said leg being securely attached to said elongated member near said first end, wherein each said leg depends downwardly from said elongated member at an angle such that the lower end of each said leg lies outside the vertical plane of said working surface;
(c) bracing means connecting said pair of legs, said bracing means being adapted to secure said legs against movement relative to said elongated member;
(d) a single leg having an upper end and a lower end, the upper end thereof being securely attached to said elongated member near said second end, wherein said leg depends downwardly from said elongated member and is disposed directly beneath said working surface;
(e) electrical receptacle means secured to said work station beneath said working surface;
(f) extensible leg means secured to said elongated member near its second end, said extensible leg means comprising:
  (1) a fixed tubular member secured at its upper end to said elongated member and depending downwardly therefrom directly beneath said working surface, said tubular member having a length no greater than the length of said single leg,
  (2) a moveable member supported by said tubular member and being adapted to move vertically relative to said tubular member, and
  (3) latch means adapted to secure said moveable member against vertical movement after said moveable member has been moved to a desired vertical position, wherein said latch means comprises a removeable pin which extends through openings in said tubular member and said moveable member.

* * * * *